United States Patent
Yoshida (10) Patent No.: US 7,599,601 B2
(45) Date of Patent: Oct. 6, 2009

(54) RECORDING METHOD AND RECORDING DEVICE

(75) Inventor: Kenji Yoshida, Kanagawa (JP)

(73) Assignee: Sony Corporation (JP)

( * ) Notice: Subject to any disclaimer, the term of this patent is extended or adjusted under 35 U.S.C. 154(b) by 821 days.

(21) Appl. No.: 11/320,347

(22) Filed: Dec. 28, 2005

(65) Prior Publication Data

US 2006/0140088 A1 Jun. 29, 2006

(30) Foreign Application Priority Data

Dec. 28, 2004 (JP) ............................. 2004-382146

(51) Int. Cl.
*H04N 7/00* (2006.01)
*H04N 5/00* (2006.01)

(52) U.S. Cl. ........................................ 386/46; 386/125

(58) Field of Classification Search ................... 386/46, 386/125, 124, 45, 117, 107
See application file for complete search history.

(56) References Cited

U.S. PATENT DOCUMENTS 6,928,228 B2 * 8/2005 Gordon ....................... 386/45
2006/0098947 A1 * 5/2006 Kim et al. .................... 386/98

* cited by examiner

*Primary Examiner*—Robert Chevalier
(74) *Attorney, Agent, or Firm*—Lerner, David, Littenberg, Krumholz & Mentlik, LLP (57) ABSTRACT

A recording device and a method therefor for recording data on a given recording medium having a maximum number of recording units available for recording and a maximum number of sub-recording units within each recording unit determined by a format thereof. In the method and device, a restriction is applied so as not to enable an additional recording on the recording medium at the time when a number of the recording units recorded on the recording medium has reached the maximum number of recording units and recording of up to a first sub-recording unit within the last recording unit has been performed. Thus, it becomes possible to prevent occurrence of a situation, which is difficult for a user to understand, e.g. the situation where the remaining capacity for recording suddenly disappears owing to e.g. change in recording mode when recording on the recording medium is performed with a recording device.

8 Claims, 6 Drawing Sheets

RECORDING METHOD AND RECORDING DEVICE

CROSS-REFERENCE TO RELATED APPLICATIONS

The present application claims priority from Japanese Patent Application No. JP 2004-382146, filed in the Japanese Patent Office on Dec. 28, 2004, the entire content of which is incorporated herein by reference.

BACKGROUND OF THE INVENTION

The present invention relates to a recording method and a recording device, which are suitable for the application to e.g. a video camera recorder that uses e.g. a recordable DVD (Digital Video Disc or Digital Versatile Disc) as a recording medium and is operable to record a moving image, etc. on the DVD.

In recent years, there have been developed various kinds of video playback devices which use a disc recording medium with a large capacity such as DVD as a recording medium. Also, a disc playback device (so-called camera recorder) integrated with a video camera has been commercialized in various kinds of products.

In a video playback device using a disc like this as a recording medium, it is possible to record on the disc until all the predetermined storage capacity thereof is occupied. For example, in the case of using a disc having a capacity that allows video data of a moving picture to be recorded for an hour at a certain bit rate, successive recording on the disc can be made for an hour.

Meanwhile, in recording video data on a disc such as DVD, the data is accompanied with a recording unit referred to as a title and a sub-recording unit referred to as a chapter, provided that each title is divided into two or more chapters. The format of DVD video determines the upper limit number of titles recordable on a disc and the maximum number of chapters within a title. Specifically, the number of titles recordable on a disc is set to ninety-nine (99), and the maximum number of chapters within a title is set to 99.

As for the chapter, in the case where recording is performed in a video camera recorder, a chapter is set in one recording. Specifically, for example, in the case where a user carries out an operation to start recording and then performs an operation to stop the recording, if one continuous record of video data of a moving picture is performed at the time when the recording is stopped, the one record of the video data of the moving picture is accompanied with one chapter number. When start and stop of recording are repeated and then the 99th chapter is recorded, the title number is incremented by one in recording next time, additional data is recorded as the first chapter of the resultant title number.

In the case where recording is continued in this way, and then up to 99 chapters of the title number 99 are recorded on one disc, an additional recording after that is not enabled because the chapter having the maximum number of the title with the maximum number has been recorded even if the disc has an unoccupied capacity. The patent document, JP-2004-201170 contains the description on the number of titles and the number of chapters that are recordable according to the DVD video format.

In the meantime, causes of the change in title based on DVD video format include the change in recording condition of video data in addition to the above-described number of chapters that has reached the maximum and the title forced to be changed by a user operation. Specifically, pieces of video data recorded in a title must be of the same format. Therefore, when an operation to change the recording format or recording mode is performed in the middle of recording, the title number of a title to be recorded next time is changed to the number resulting from increment of the current title number by one at the time of performing such operation.

More specifically, two or more recording modes are prepared as modes for recording in e.g. DVD video, and the bit rate and image size of data are changed depending on the recording modes. Therefore, the maximum length of time during which recording can be performed on one disc is changed. For example, there is a type of recorder in which the following modes are prepared: HQ mode that enables twenty (20) minutes of recording on one disc; SP mode that enables thirty (30) minutes of recording; and LP mode that enables sixty minutes of recording. (The names such as HQ mode and SP mode and the length of time during which recording can be executed may differ among manufacturers of recorders.) Now, when a change in recording mode that causes particularly the change in image size (the number of pixels that constitute an image of one frame) is made, the title must be changed to another title.

Also, in the case where an operation that causes the change in aspect ratio of an image to be recorded is executed, the recorded title is changed to another one.

In the case where a change in mode or recording condition like this alters the title, if the title number of a title in the middle of the recording on the disc is sufficiently smaller than the maximum title number, there is no particular problem, but in the situation where titles of up to the maximum number have been recorded, an additional recording on the disc is disabled concurrently with execution of the change in mode or recording condition even when the disc has an unoccupied capacity.

In other words, in the case of simply repeating start and stop of image recording, recording can be executed to the 99th chapter of the 99th title. Therefore, for example, it is assumed that a user has confirmed through display that the disc still has a remaining capacity which allows recording to be executed for 10 minutes in the current mode after having recorded the 19th chapter of the 99th title. In this case, if the recording mode is left as it is, recording can be performed up to the 99th chapter having the maximum chapter number, and additional 80 chapters can be recorded as long as the disc has a remaining capacity.

However, when a user performs an operation to change the recording mode or the aspect ratio of a recorded image in this situation, the title must be changed concurrently with the operation, whereas the disc is changed to the state in which it has no recordable remaining capacity suddenly after the change because the titles of up to the maximum title number have been already recorded and therefore there is no room to change the title on the disc.

The reason why such situation takes place is difficult to understand for the user who has executed the operation in many cases. This is because the display is changed to no remaining capacity for recording suddenly after the execution of an operation to change the mode or the like, while the user has confirmed through guidance display that a capacity for recording remains sufficiently.

In the above description, the problems in the case where recording is performed in a video camera recorder according to the DVD video format have been described. However, there are similar restrictions in association with recording units in general also when data such as video data is recorded on a recording medium such as a disc based on another format. Therefore, in the case where recording is executed on such recording medium having restrictions in association with recording units, similar problems arise in recording.

SUMMARY OF THE INVENTION

The invention was made in consideration of the points of view. Accordingly, it is desirable to prevent the occurrence of a situation, which is difficult for a user to understand, such as the situation where the remaining capacity for recording suddenly disappears owing to the change in recording mode or the like when recording is performed with this kind of recording device.

According to an aspect of the invention, in the case of recording data on a given recording medium having a maximum number of recording units available for recording and a maximum number of sub-recording units within each recording unit determined by a format thereof, a restriction is applied so as not to enable an additional recording on the recording medium at a time when a number of the recording units recorded on the recording medium has reached the maximum number of recording units and recording has been performed up to a first sub-recording unit within last one of the recording units.

As a result of such arrangement, when an additional recording on a recording medium is enabled, the number of recording units is at least equal to or smaller than a number just before the number assigned to the last title. In this case, the maximum recording state can be set under the same condition even in the case of changing the recording mode, etc. and then newly starting the recording or the case of starting the recording without changing the recording mode, etc.

According to the aspect of the invention, when an additional recording on a recording medium is enabled, the number of recording units is at least equal to or smaller than a number just before the number assigned to the last title. In this case, the maximum recording state can be set under the same condition even in the case of changing the recording mode, etc. and then newly starting the recording or the case of starting the recording without changing the recording mode, etc. As a result, it can be made possible to effectively prevent the difference in a remaining capacity of the disc available for recording from being developed by the difference in operation condition. Therefore, it becomes possible to provide an operational environment easily understandable for a user.

In this case, it is judged that a number of the recording units recorded on the recording medium has reached the maximum number of recording units in a situation where recording units of up to a number just before the maximum number of recording units prescribed by the format have been recorded. For example, a room to record data for index is ensured in the last recording unit on the disc, whereby recording with a good quality is enabled.

Also, in the situation where recording units of up to a number just before the maximum number of recording units prescribed by the format have been recorded, the recording medium is a recording medium to record video data, and still video image data created from data recorded in the other recording units is recorded in the last recording unit on the recording medium, whereby it becomes possible to record data for index based on the still video image.

In addition, it is made possible to display that no additional recording is enabled because the number of recording units reaches its maximum when the restriction is applied, which makes it possible to provide a user with an accurate notice of the situation where no recording is enabled.

DETAILED DESCRIPTION

An embodiment of the invention will be described below with reference to the drawings.

An example of the embodiment applied to a video camera recorder is presented here. First of all, a configuration of the video camera recorder will be described with reference to FIG. 1. The video camera recorder 100 in the example is a video playback device using, as a recording (or storage) medium, a disc recording medium referred to as DVD, which includes a camera section 10 operable to take an image and a recording/reproducing section 20 operable to perform recording and reproduction on the disc.

Figure 1:
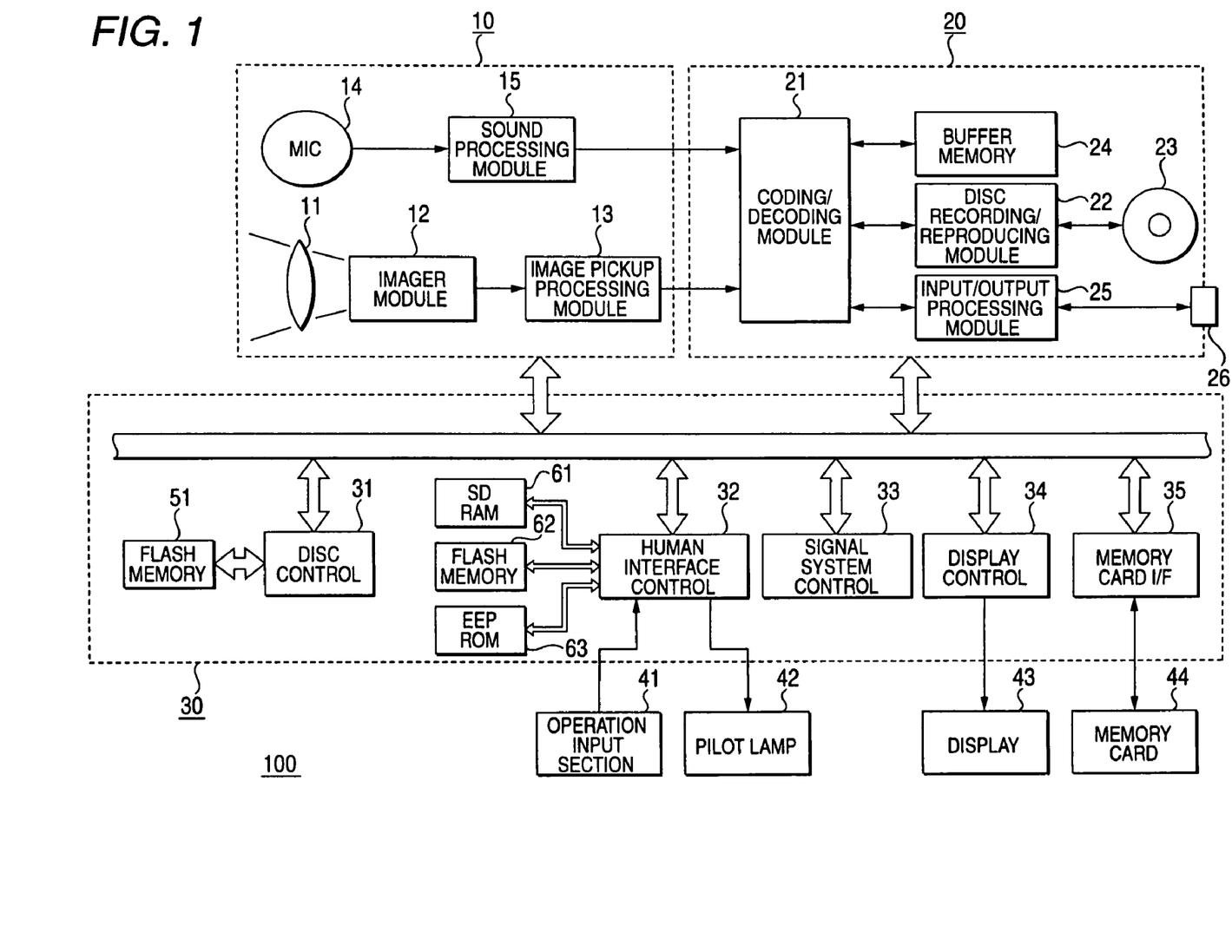
FIG. 1 is a block diagram showing an example of an electronic system (a video camera recorder) according to an embodiment of the invention.

The camera section 10 includes an optical system 11 made up of a lens, etc., an imager module 12 operable to convert an image light focused by the optical system 11 into electrical signals, and an image pickup processing module 13 operable to make the image signals produced in the imager module 12 digital video data in a given format. Also, the camera section 10 includes a microphone 14 and a sound processing module 15, in which a sound signal picked up by the microphone 14 is made digital audio data by the sound processing module 15. The processes of a video image and sound in the camera section 10 are executed under the control based on an instruction from the control section 30. Specifically, image and sound pickups are controlled according to an instruction from the human interface control module 32 in the control section 30, and the conditions to process a video image and sound are set according to an instruction from the signal system control module 33. In regard to video data, there are the following two cases: one is the case where video data is captured as moving picture data and another is the case where video data is captured as still image data. Between the two cases, processing conditions are different. As for sound signals, an external microphone (not shown) other than the microphone 14 may be connected, and therefore two or more modes to capture sound signals can be set depending on the configuration of the connected microphone and the sound mode set by a user operation. For example, the following can be set: 2-channel stereo recording mode; and 5.1-channel recording mode.

The digital video data and digital sound data, which the camera section 10 outputs, are supplied to the coding/decoding module 21 in the recording/reproducing section 20 and then coded for recording. For example, in recording a moving picture, video data and sound data are coded according to MPEG (Moving Picture Experts Group)-2 system. In recording video data as a still image, the data are coded according to JPEG (Joint Photographic Experts Group) system. In coding by the coding/decoding module 21, the coding is performed with a coding ratio and an image size, which the control section 30 directs. The coded data is temporarily accumulated in a buffer memory 24 connected to the coding/decoding module 21 until the data is recorded on the disc.

When a timing of recording comes, the coded data accumulated in the buffer memory 24 is read out by the disc recording/reproducing section 22, and subjected to the processing for recording on the disc 23. Then, the data is recorded on the disc 23 through laser irradiation by an optical pickup that is not shown. Also, data recorded on the disc 23 is read out by the disc recording/reproducing section 22, sent to the coding/decoding module 21, and subjected to decoding according to MPEG-2 system. The decoded video and sound data are sent to the input/output processing module 25 and then output to the outside through the terminal portion 26. The recording and reproducing operations by the recording/reproducing section 20 are executed under the control based on an instruction from the control section 30. That is, the recording on the disc and reproduction of a content of the disc are carried out under the control of the disc control module 31 in the control section 30.

The terminal portion 26 includes terminals for input and output of digital data in addition to terminals for input and output of analog video and sound signals. The terminals for digital data may be, for example, terminals (ports) based on IEEE (The Institute of Electrical and Electronics Engineers) 1394 standards, or terminals based on USB (Universal Serial Bus) standards, which enables communications of video data and sound data with video equipment, computer paraphernalia, etc., which have terminals meeting the appropriate standards. The terminals may be connected to an information processing device such as computer paraphernalia so that the video camera recorder can receive various kinds of data.

As for a configuration of the control section 30, it includes a disc control module 31, a human interface control module 32, a signal system control module 33 and a display control module 34, each having a microcomputer operable to perform a control operation. The human interface control module 32 is supplied with operation input data from an operation input section 41 such as an operation key or a touch panel. Based on an operation input, the human interface control module 32 controls sections of the video camera recorder so that the sections are brought into the working conditions according to the operation input. Also, the human interface control module 32 serves to perform the lighting control of the pilot lamp 42 that includes a light-emitting diode or the like. The pilot lamp 42 is used as a recording lamp to show that the video camera recorder is recording.

The signal system control module 33 performs the control to set the paths of signal processing in the camera section 10 and the recording/reproducing section 20 and others. The display control module 34 controls, based on an instruction from the human interface control module 32, display by the display section 43 that the video camera recorder has for monitoring. The display section 43 includes, for example, a liquid crystal display panel, and serves to display a shot image or a reproduced image as a picture. In addition, the video camera recorder is arranged so that various messages or the like can be OSD-displayed with characters or graphic symbols in the picture under the control of the display control module 34 based on an instruction from the human interface control module 32 (OSD: On Screen Display). Character and graphic symbol data required for the OSD-display are previously prepared in a memory (not shown) that the display control module 34 includes. OSD-displayed messages are, for example, the remaining capacity of the disc by which recording on the disc is enabled. In this embodiment, the surface portion of the display screen of the display section 43 is constructed as a touch panel, and a user can perform the operation for a function displayed on the display screen by touching the surface portion of the display screen of the display section 43.

To the disc control module 31 is connected a flash memory 51 in which a program to make the disc control module 31 perform the control operations is stored. The function that the disc control module 31 can control depends on the program stored in the flash memory 51. When the disc control module 31 controls recording on the disc 23, it determines recording units by a title and a chapter, provided that the title and chapter are a recording unit and sub-recording unit respectively, which depend on the DVD video format. The maximum numbers of recordable titles and chapters are set based on a direction from the human interface control module 32 within the ranges depending on the format.

To the human interface control module 32 are connected: an SDRAM 61 to temporarily accumulate data in for the processing by the human interface control module 32; a flash memory 62 in which a program to make the human interface control module 32 perform a control operation is stored; and an EEPROM 63 in which setting data and the like are stored. In this embodiment, the human interface control module 32 restricts the maximum numbers of titles and chapters that can be recorded on the disc 23. The restrictions are to be described later.

Also, in the embodiment the control section 30 includes a memory card interface (I/F) module 35, which enables data transfer between the sections of the recorder and a memory card 44 attached to a card slot of the video camera recorder. In the memory card 44, e.g. the data of a shot still image can be stored.

Now, the case of setting the title number and chapter number under the control of the human interface control module 32 and others in recording by the video camera recorder 100 will be described. The video camera recorder 100 in the embodiment is a recording device operable to record video and sound data on the disc 23 in a DVD video format. As already described in BACKGROUND OF THE INVENTION, the number of titles that can be recorded on a disc is up to ninety-nine (99) according to the format, and the maximum number of chapters in each title is also 99. However, in the embodiment the number of titles is restricted to up to ninety-eight (98) in recording video data of a moving picture or a still image. In addition, in recording the ninety-eighth title, i.e. the last title, even in the case where the disc still has a remaining storage capacity at the time when recording of one chapter is completed, the record on the disc is treated as being full, and then recording on the disc after that is restricted so as not to be carried out.

Figure 2:
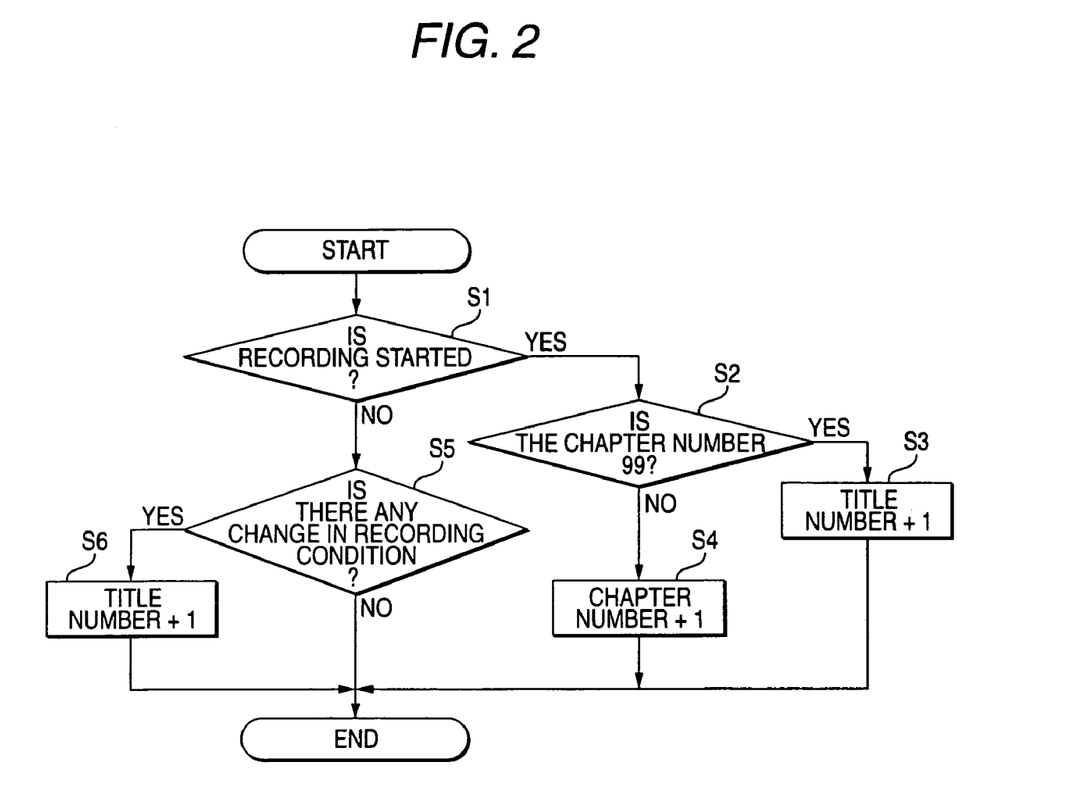
FIG. 2 is a flow chart showing an example of a title and chapter setting according to the embodiment of the invention.

First, a process of setting a title and a chapter normally will be described with reference to the flow chart of FIG. 2. (The restricting process specific to the embodiment is not considered in the process shown by FIG. 2.) Initially, it is judged whether or not an operation to start recording (image recording) has been done (Step S1). When it is judged that the operation to start recording has been done, it is judged whether or not the current recorded chapter number is ninety-nine (99) (Step S2). When it is judged that the last chapter number at current moment is 99, the recorded title number incremented by one is set as a new title number and the recording is started form the first chapter of the new title number (Step 3). In contrast, in the judgment at Step S2 it is judged that the last chapter number is not 99, the chapter number incremented by one is set as a new chapter number and then recording is started from the new chapter (Step S4).

On the other hand, in the situation where it is judged at Step S1 that the operation to start recording has not been done, i.e. the situation where recording is stopped, it is judged whether or not an operation to change a recording condition has been done (Step S5). The operation to change a recording condition here means, for example, an operation to change a recording mode by which the size of an image is changed, an operation to change the aspect ratio, i.e. length vs. breadth ratio, of a recorded image from 4:3 to 16:9 (or 16:9 to 4:3) or an operation to change the sound recording mode. Incidentally, in the case of changing the sound recording mode, the sound recording mode may be changed by a user operation, otherwise the mode may be forced to change by removing the external microphone. Specifically, the latter case means that when the mode in which recording by the built-in microphone (e.g. 2-channel mode) is enabled differs from the sound mode set currently (e.g. 5.1-channel mode), the external microphone supporting to the currently set sound mode is removed. After the operation to change a recording condition like this is done (or the microphone is removed), when the operation to start recording is performed, the title number is incremented by one. Then, recording is performed for the chapter number 1 of the resultant title number (Step S6).

Now, a recording inhibition process unique to the video camera recorder 100 will be described with reference to the flow chart of FIG. 3. First, it is judged whether or not a user has performed an operation to start recording (Step S11). When it is judged that the operation to start recording has not been performed, any process is not carried out particularly. When the operation to start recording has been performed, it is judged whether or not the recording has been performed up to the first chapter of the title with an upper limit title number (Step S13). As for the upper limit title number described here, when the configuration which allows up to 99 titles to be recorded on the disc is adopted, the maximum number of titles minus one (1), namely 98, is set as the upper limit title number.

When recording has not been performed to the first chapter of the title having the upper limit title number, recording is started (Step S12). When it is judged that recording has been performed to the first chapter of the title having the upper limit title number (i.e. the first chapter of 98th title), recording is not started and is restricted to no-recording state.

Figure 3:
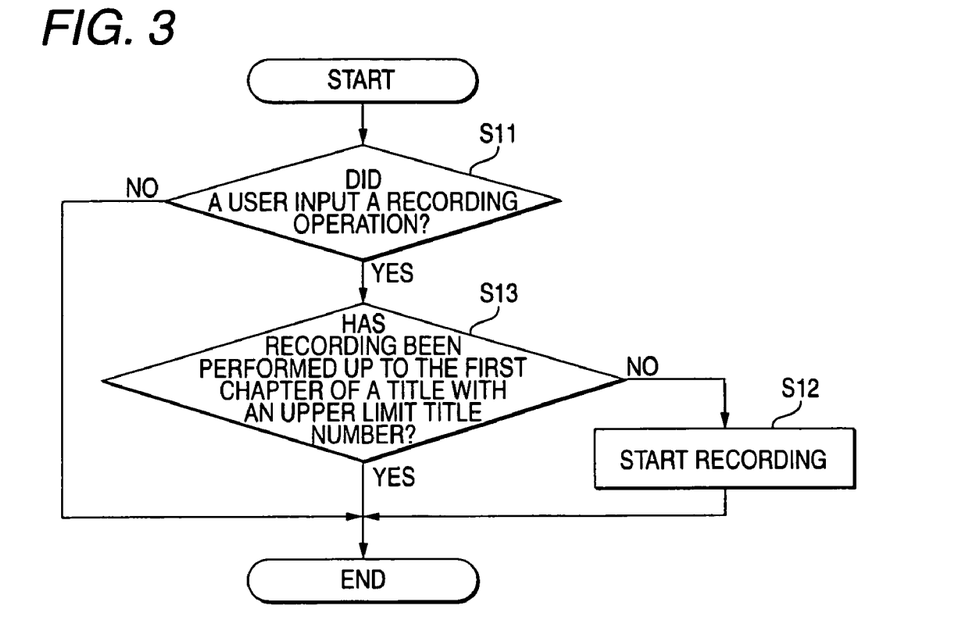
FIG. 3 is a flow chart showing an example of processing of recording inhibition control according to the embodiment of the invention.
Figure 4:
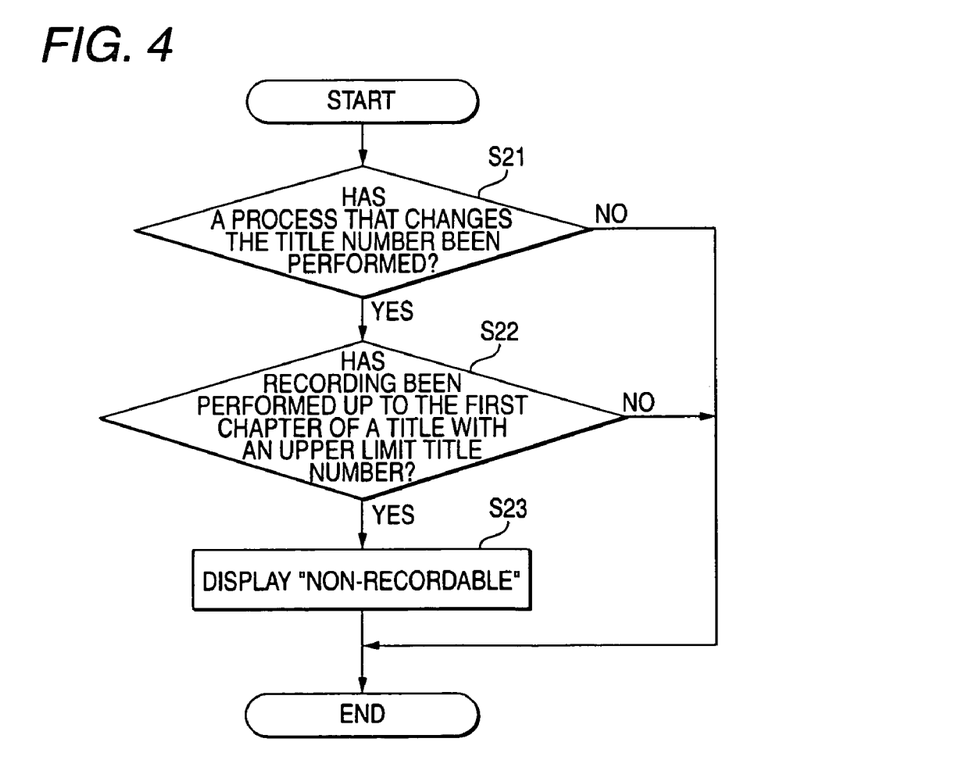
FIG. 4 is a flow chart showing an example of display processing of recording inhibition according to the embodiment of the invention.

The process according to the flow chart of FIG. 3 is to restrict the recording operation on the disc itself. However, the embodiment is arranged so that it can be shown by a character message, a graphic symbol or the like in the display by the display section 43 or the like that the video camera recorder is in the no-recording state. The flow chart of FIG. 4 is one showing a control condition to display the no-recording state, showing a display condition in the display section 43 based on e.g. an instruction from the human interface control module 32 to the display control module 34.

First, it is judged whether or not a process to change the title number has been executed (Step S21). When the process to change the title number has been executed, it is judged whether or not the first chapter of the title having the upper limit title number has been recorded (Step S22). When the first chapter has been recorded, it is displayed by the display section that recording is not enabled (Step S23).

Figure 5A:
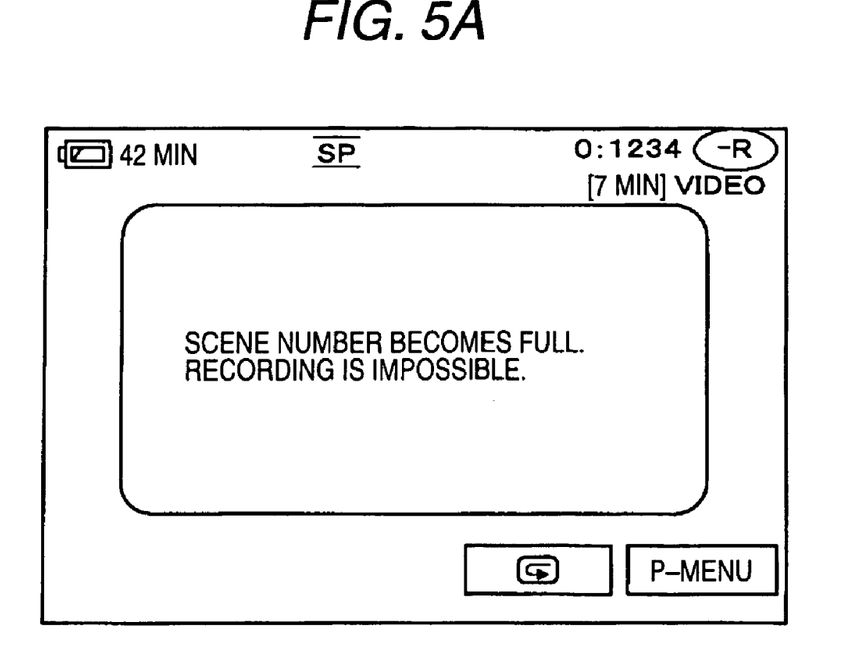
FIGS. 5A and 5B are illustrations each showing an example of display according to the embodiment of the invention.
Figure 5B:
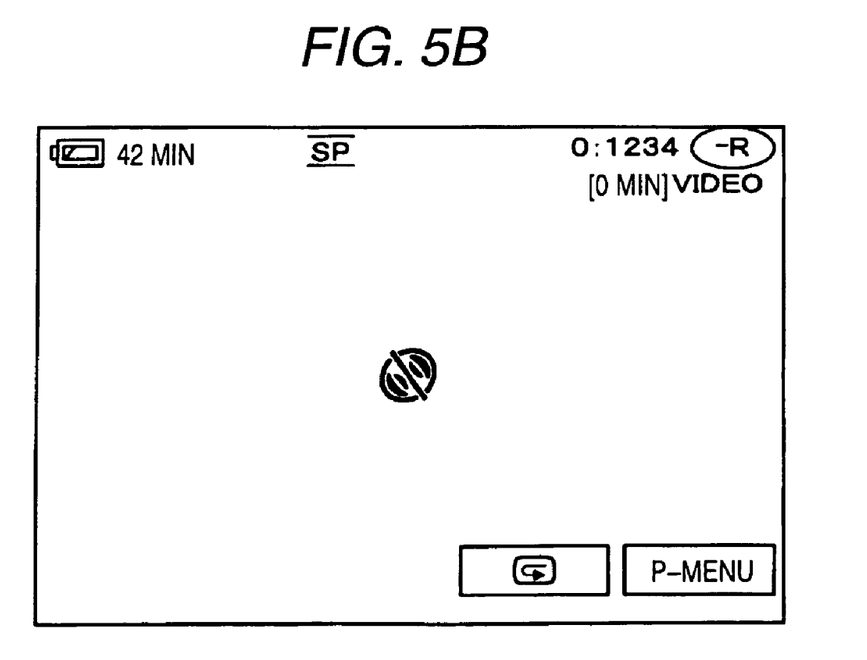
Figure 6A:
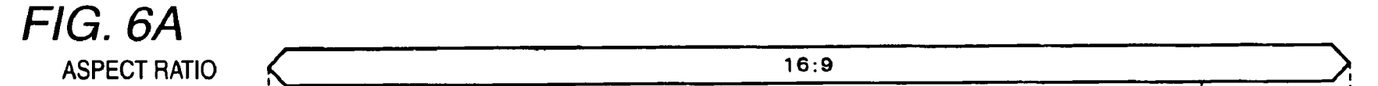
FIG. 6 is an illustration showing examples of recording conditions with changes in title and chapter numbers according to the embodiment of the invention.
Figure 6B:
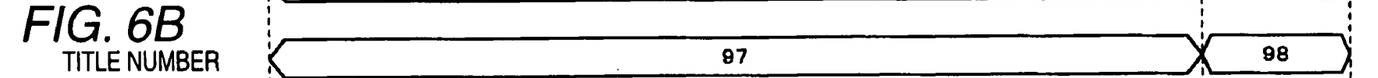
Figure 6C:
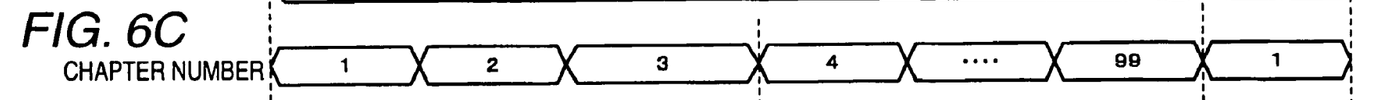
Figure 6D:
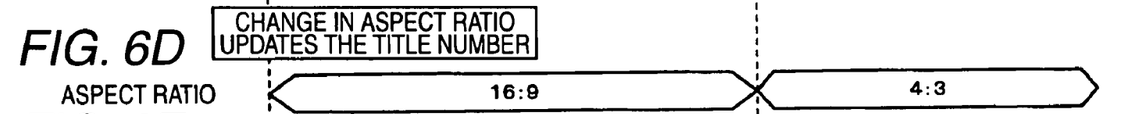
Figure 6E:
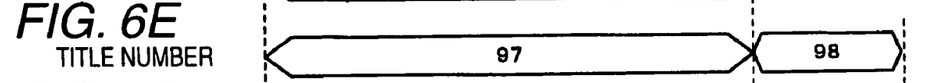
Figure 6F:
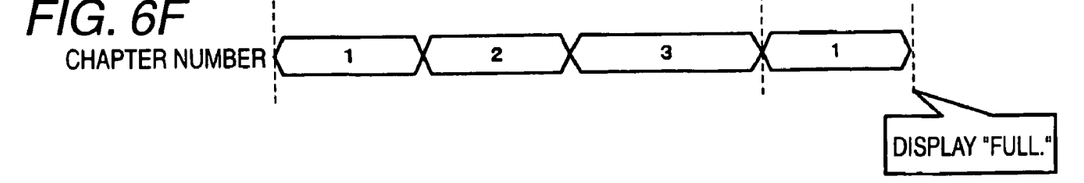

FIGS. 5A and 5B are views each showing an example of display in the display section 43 when recording has been performed to the first chapter of the title having the upper limit title number. FIG. 5A presents an example of a situation where a character message is OSD-displayed, for example, in the case where an operation to start recording has been performed. In the drawing, the following is shown as the display to provide a notification showing that the upper limit chapter number of the title having the upper limit title number has been reached: "Scene number becomes Full. Recording is impossible".

The display as illustrated in FIG. 5A may be presented, for example, when an operation to start recording is performed after recording has been performed to the first chapter of the title having the upper limit title number. Alternatively, at the time when recording of the first chapter of the title having the upper limit title number is completed, the display shown in FIG. 5A may be presented.

After such display, when the disc 23, on which the first chapter of the title having the upper limit title number has been recorded, is left loaded in the recorder, a display by e.g. a graphic symbol showing that recording has been performed to the first chapter of the title having the upper limit title number is presented as illustrated in FIG. 5B. In this display, it is shown that recording is not enabled by discontinuously or continuously displaying the graphic symbol having the shape of an elliptical disc and an oblique line across the symbol in the center of the screen. In this case, as for the display of remaining recordable time during which recording on the disc can be performed (time display in the second line of an upper right corner of the screen in FIG. 5B), "0 min." is displayed, thereby providing a notification clearly showing no more recording available on the disc.

FIG. 6 is a view showing examples of relations between display situations and recorded title numbers and recorded chapter numbers. For example, in the condition where the aspect ratio, i.e. length vs. breadth ratio, of a shot video image is set to 16:9 as shown by the line labeled with (a) in FIG. 6, and the title number is 97 as shown by the line labeled with (b) in FIG. 6, when start and stop of the recording are repeated until the 99th chapter is recorded and then further recording is performed as shown by the line labeled with (c) in FIG. 6, the title number is turned into 98 and the first chapter of the 98th title is recorded. Then, at the time when recording of the first chapter of the 98th title is stopped, the display, "FULL DISC," showing there is no more capacity for recording available on the disc is presented even if the disc still has a recordable capacity remaining therein.

Not only in the case where start and stop of recording are repeated like this, but also in the case where a recording condition or recording mode is changed, the title can be changed and thus the first chapter of the 98th title can be targeted for recording. Specifically, for example, in the condition where the aspect ratio, i.e. length vs. breadth ratio, of a shot video image is set to 16:9 as shown by the line labeled with (d) in FIG. 6, and the title number is 97 as shown by the lines labeled with (e) and (f) in FIG. 6, when the aspect ratio is switched to 4:3, the title number for recording after that is incremented by one. At the time when recording of the first chapter of the 98th title is finished, the display, "FULL DISC," showing there is no more capacity for recording available on the disc is represented even if the disc still has a recordable capacity remaining therein.

Figure 7:
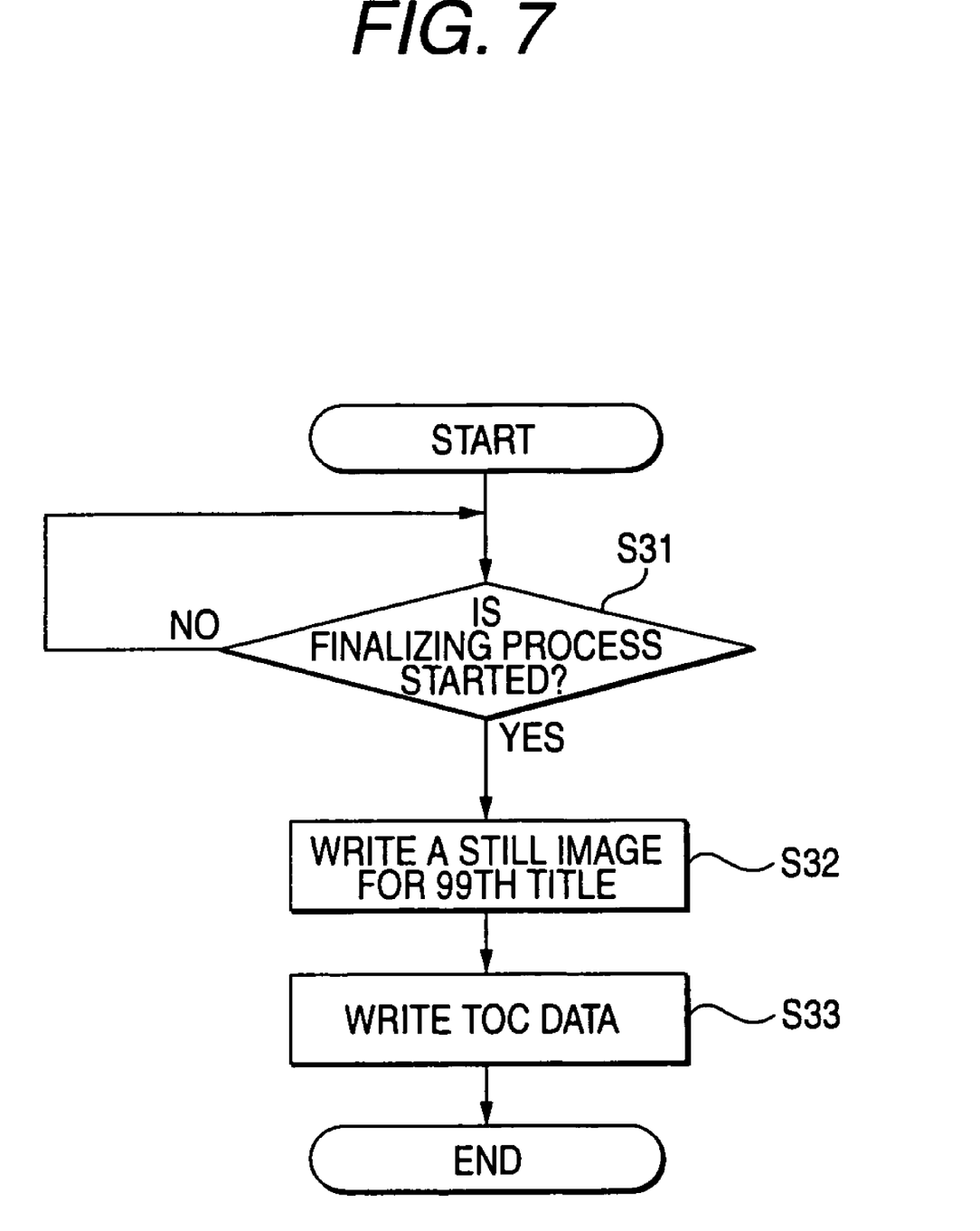
FIG. 7 is a flow chart showing an example of a finalizing process according to the embodiment of the invention.

The disc 23 subjected to recording by the video camera recorder 100 in this way requires finalizing finally. The flow chart of FIG. 7 shows an example of the finalization. For example, when an operation to start the finalizing process is performed on a menu screen or the like (Step S31), a title for index is created as the last title (99th title when up to 98 titles have been recorded) and recorded on the disc (step S32), in which the title for index is formed from a still image selected by a given process out of video images (moving pictures or still images) recorded for the titles before it. In addition, index data (e.g. so-called TOC data) prescribed by the format of the disc is recorded in a given area on the disc, and a padding process to fill an unrecorded portion of the disc with some data is performed (Step S33), and then the finalizing process is completed.

If recording on a disc is performed in this way, even in the case where the title number reaches near the limit thereof, for example, by repeating start and stop of the recording while the recorder performs the recording, the recordable remaining capacity of the disc will be controlled in the same condition even in the case of simply repeating start and stop of recording or the case of changing the recording condition or the recording mode. In other words, when an additional recording on a recording medium is enabled, the number of recording units is at least equal to or smaller than a number just before the number assigned to the last title. In this case, the maximum recording state can be set under the same condition even in the case of changing the recording mode, etc. and then newly starting the recording or the case of starting the recording without changing the recording mode, etc. As a result, it can be made possible to effectively prevent the difference in a remaining capacity of the disc available for recording from being developed by the difference in operation condition. Therefore, it becomes possible to provide an operational environment easily understandable for a user. In the related art, the recording was enabled up to the 99th chapter of the 98th title when start and stop of recording were simply repeated, whereas even the recording of a chapter before the 99th chapter of the 98th title could be restricted when the recording mode was changed, which made the recording process difficult for a user to understand. However, there is not such disadvantage in the embodiment.

The above embodiment is arranged so that image recording for index is performed for the last title (99th title) and as such, recording of the title just before the last title is restricted. However, in the case of not performing image recording for index like this, recording of up to the first chapter of the last title may be made allowable. The maximum number of the recording units may be determined depending on the format as described above, otherwise it may be preset by the recorder so as to be limited to a number equal to or more than the number restricted by the format.

The above embodiment has been described focusing on the case where the video camera recorder performs recording on a DVD-format disc. However, even in recording on various kinds of other recording media (e.g. a disc and memory card based on another format), the same recording restriction or display based on the restriction may be performed. In this case, the same recording restriction may be performed using a recording unit prescribed by each of the media (representing the above-described title) and a sub-recording unit (representing the above-described chapter) resulting from the division of each of the recording units, while the recording is restricted by recording units such as a title and chapter, both prescribed by the DVD video format, in the above-described embodiment. Also, data to be recorded is not limited to video data as described above. In other words, the invention is applicable to various kinds of processes to restrict the maximum number of recording units that allow a given data such as moving picture data to be recorded.

It should be understood by those skilled in the art that various modifications, combinations, sub-combinations and alterations may occur depending on design requirements and other factors insofar as they are within the scope of the appended claims or the equivalents thereof.

The invention claimed is:

1. A recording method of recording data on a given recording medium having a maximum number of recordable recording units and a maximum number of sub-recording units within each recording unit determined by a format thereof, the method comprising the step of applying a restriction so as not to enable an additional recording on the recording medium at a time when a number of the recording units recorded on the recording medium has reached the maximum number of recording units and recording has been performed up to a first sub-recording unit within last one of the recording units.

2. The recording method of claim 1, wherein it is judged that a number of the recording units recorded on the recording medium has reached the maximum number of recording units in a situation where recording units of up to a number just before the maximum number of recording units prescribed by the format have been recorded.

3. The recording method of claim 2, wherein the recording medium is a recording medium to record video data, and
in the last recording unit on the recording medium, still video image data created from data recorded in the other recording units is recorded.

4. The recording method of claim 1, further comprising the step of displaying that no additional recoding is enabled because the number of recording units reaches its maximum when the restriction is applied.

5. A recording device operable to record data on a given recording medium having a maximum number of recordable recording units and a maximum number of sub-recording units within each recording unit determined by a format thereof, comprising:
a recording mechanism operable to record data on the recording medium; and
a controlling mechanism operable to apply a restriction so that the recording mechanism performs no additional recording on the recording medium at a time when a number of the recording units recorded on the recording medium has reached the maximum number of recording units and recording has been performed up to a first sub-recording unit within last one of the recording units.

6. The recording device of claim 5, wherein the controlling mechanism judges that a number of the recording units recorded on the recording medium has reached the maximum number of recording units in a situation where recording units of up to a number just before the maximum number of recording units prescribed by the format have been recorded.

7. The recording device of claim 6, wherein the data to be recorded on the recording medium by the recording mechanism is video data, and
the recording mechanism records, in the last recording unit on the recording medium, still video image data created from data recorded in the other recording units under the control of the controlling mechanism.

8. The recording device of claim 5, further comprising a display mechanism operable to display a state of the device, wherein the display mechanism is forced to display that no additional recoding is enabled because the number of recording units reaches its maximum when the controlling mechanism applies the restriction.

* * * * *

UNITED STATES PATENT AND TRADEMARK OFFICE
CERTIFICATE OF CORRECTION

PATENT NO. : 7,599,601 B2
APPLICATION NO. : 11/320347
DATED : October 6, 2009
INVENTOR(S) : Kenji Yoshida It is certified that error appears in the above-identified patent and that said Letters Patent is hereby corrected as shown below:

Column 3, line 8, "situation," should read --situation--;

Column 3, line 24, "last" should read --the last--;

Column 3, line 48, "a" should read --the--;

Column 5, line 35, "enables" should read --enable--;

Column 7, line 1, "at current" should read --at the current--;

Column 10, line 16, "last" should read --the last--;

Column 10, line 46, "last" should read --the last--;

Column 10, line 63, "recoding" should read --recording--.

Signed and Sealed this

Twenty-third Day of November, 2010

David J. Kappos
*Director of the United States Patent and Trademark Office*